United States Patent [19]

Hsieh et al.

[11] Patent Number: 5,082,990
[45] Date of Patent: Jan. 21, 1992

[54] ALKYLATION OF AROMATICS-CONTAINING REFINERY STREAMS

[75] Inventors: C. Richard Hsieh, San Rafael; A. John Gloyn, Walnut Creek, both of Calif.

[73] Assignee: Chevron Research and Techology Company, San Francisco, Calif.

[21] Appl. No.: 607,975

[22] Filed: Nov. 1, 1990

Related U.S. Application Data

[63] Continuation-in-part of Ser. No. 264,121, Oct. 28, 1988, abandoned.

[51] Int. Cl.⁵ .............................................. C07C 2/68
[52] U.S. Cl. ..................................... 585/467; 208/46; 208/66
[58] Field of Search ..................... 208/46, 66; 585/467

[56] References Cited

U.S. PATENT DOCUMENTS

| | | | |
|---|---|---|---|
| 4,209,383 | 6/1980 | Herout et al. | 208/93 |
| 4,849,569 | 7/1989 | Smith | 585/446 |
| 4,975,179 | 12/1990 | Harandi et al. | 585/467 |

Primary Examiner—Curtis R. Davis

[57] ABSTRACT

A process is disclosed for reducing the concentration of light aromatics, especially benzene, in a refinery stream by catalytic alkylation using an olefin-containing stream in a distillation column.

19 Claims, 4 Drawing Sheets

ALKYLATION OF AROMATICS-CONTAINING REFINERY STREAMS

CROSS REFERENCE TO RELATED CASES

This application is a continuation-in-part of application Ser. No. 264,121 filed Oct. 28, 1988 and now abandoned.

BACKGROUND OF THE INVENTION

1. Field of the Invention

The present invention relates to a new method of conducting catalytic chemical reactions in a refinery distillation column wherein product, by-product, and unreacted feed are continuously separated. More particularly, it relates to a new method of producing high octane gasoline blending stock by catalytically reacting the dilute aromatics in certain refinery streams with olefins in other streams. The present invention is especially useful for reducing light aromatics, particular benzene, in gasoline while also converting olefins in relatively low value refinery fuel gas streams to high value liquid products.

The lead phaseout and the introduction of premium unleaded gasoline has created strong demand for increasing gasoline octane numbers. Conventional approaches such as increasing operating severity in reformers and fluid catalytic cracking units, or using octane catalysts and additives result in losses of gasoline yields. In addition, these approaches often increase the fuel gas yields in a refinery which may sometimes cause a reduction in refinery throughput and profitability.

Typical gasoline contains about 2% benzene, a chemical which has a high octane blending value, but is considered environmentally hazardous. The State of California, for example, has officially included benzene in its toxic chemicals list, and the United States Environmental Protection Agency is considering regulations to limit the amount of benzene which may be present in gasoline. It is therefore highly desirable to remove benzene from gasoline. However, physically separating benzene from gasoline has the undesirable effect of decreasing both the octane rating and volume of gasoline.

As an alternative, benzene in gasoline may be hydrogenated to a non-aromatic compound. This approach is also undesirable, however, because it requires a relatively high pressure operation and consumes hydrogen which is usually expensive in a refinery. Hydrogenation of benzene also reduces the octane rating of gasoline.

To overcome these disadvantages, it has been found that by alkylating the benzene the environmental impact is reduced, while both the octane and volume of gasoline are actually improved. The present invention addresses a novel process for the catalytic alkylation of benzene in a blending component or refinery stream during the refining process itself using an olefin-containing stream in a distillation column.

The chemical reactions involving alkylation of aromatics with olefins have been studied for a long time. For example, U.S. Pat. No. 2,860,173 discloses the use of a solid phosphoric acid (SPA) as a catalyst for the alkylation of benzene with propylene to produce cumene. U.S. Pat. No. 4,347,393 discloses the use of Friedel Crafts catalysts, especially aluminum chloride for this reaction. More recently, certain rare earth modified zeolites and Mobil's HZSM-5 zeolite catalyst have been used to carry out this reaction. Examples may be found in the *Journal of Catalysis*, Vol. 109, pages 212-216 (1988).

The alkylation of benzene with ethylene to produce ethylbenzene is a known commercial process. The Mobil/Badger ethylbenzene process produces high purity ethylbenzene in vapor phase with a multiple-bed reactor and a series of distillation columns. A description of the process using a dilute ethylene stream may be found in the *Oil and Gas Journal*, Vol. 7, pages 58-61 (1977).

It is important to distinguish that while catalytic aromatic alkylation is known, it is subject to the unexpected and unpredictable vagaries of catalytic processes. For example, in U.S. Pat. No. 3,527,823 (Jones) there is disclosed the reaction of benzene and propylene over phosphoric acid catalyst in a fixed bed upflow reactor to produce cumene. While the benzene-propylene reaction was successful, the Jones process was not applicable to the reaction of benzene and ethylene (column 13, line 36). Poor yields of ethyl benzene were obtained by Jones. However, increased ethylene purity increased the conversion of ethylene (column 13, line 10) although the yield of ethyl benzene was still not satisfactory. In another U.S. Pat. No., 3,437,705, Jones discloses the alkylation of an aromatic compound with an olefin in an aromatic to olefin mol ratio of from 2:1 to 30:1. The process is characterized by the presence of an unreacted vapor diluent, such as propane, in the reaction zone. The total alkylation effluent is passed to a flash distillation zone where the unreacted diluent is separated. The process is purportedly applicable to a variety of reactions using feedstocks containing unreactive vapor diluents.

The concept of catalytic distillation, to the extent chemical reactions and distillation are carried out in the same vessel, is known. U.S. Pat. No. 3,629,478 discloses a method for separating linear olefins from tertiary olefins by feeding a mixture of alcohol, tertiary pentenes and linear pentenes to a distillation column reactor, catalytically reacting the tertiary pentenes with the alcohol by contacting them with heterogeneous catalyst located above the feed zone, and fractionating the ether from the linear pentene in the distillation column reactor. U.S. Pat. Nos. 3,634,534 and 3,634,535 disclose a method for separating a first chemical from a mixture of chemicals using two distillation column reactors in series. In the first distillation column reactor, the first chemical undergoes a reaction to form a second chemical which is easily fractionated from the mixture of chemicals. This second chemical is then fed to the second distillation column reactor, where the reaction is reversed and the first chemical is recovered by fractionation.

U.S. Pat. Nos. 4,232,177 and 4,307,254 disclose a method for conducting chemical reactions and fractionation of a reaction mixture comprising feeding reactants to a distillation column reactor into a feed zone and concurrently contacting the reactants with a fixed bed catalytic packing to carry out both the reaction and fractionate the reaction mixture. One example is the preparation of methyl tertiary butyl ether (MTBE) in high purity from a mixed feed stream of isobutene and normal butene with a properly supported cationic ion exchange resin. U.S. Pat. No. 4,242,530 discloses a method for the separation of isobutene from a mixture comprising n-butene and isobutene by feeding a $C_4$ stream to a distillation column reactor and contacting the stream with fixed bed acidic cation exchange resin to form disobutene which passes to the bottom of the column, said n-butene being removed overhead. U.S. Pat. No. 4,624,748 discloses a novel catalyst system for use in a distillation column reactor which includes annularly-defined spaces within the reactor.

U.S. Pat. NO. 4,849,569 (Smith) discloses a process for alkylating aromatic compounds by contacting the aromatic compound with a $C_2$ to a $C_{20}$ olefin in a distillation column reactor containing a fixed bed acidic catalyst comprising molecular sieves and cation exchange resins. The mol ratio of aromatic compounds to olefin is in the range of 2-100:1, since the greater the excess of aromatic compound the more selectivity is given to the desired product.

In spite of the art discussed, catalytic distillation reaction processes are not conventionally applied to complex hydrocarbon feedstocks and catalytic reactions thereof. It is important to distinguish that while such U.S. Pat. Nos. as 3,629,478 (Haunschild), 4,849,569 (Smith) and 4,471,154 (Franklin) disclosed the use of distillation reactors, neither suggests the use of complex refinery streams as feedstocks for such distillation reaction processes. Refinery streams are complex when they contain many different chemical components in a boiling range. Conventional distillation reaction processes are limited to reactive feed streams each of which is relatively pure, in the sense that each is composed of chemical constituents having some physical and/or chemical similarity.

A paper, "Alkylation of FCC Off-gas Olefins with Aromatics Via Catalytic Distillation", I.E. Partin, presented at the National Petroleum Refiners Association Meeting, Mar. 22, 1988, discloses a catalytic distillation process which alkylates the refiners light olefin gases such as ethylene and propylene, present in FCC and coker unit tail gas with light aromatics such as benzene and toluene, present in reformate to produce alkylated aromatics.

In the process as taught in this paper, full range reformate is charged to the lower distillation section and the total FCC off-gas stream is charged beneath the catalyst section. The solid proprietary catalyst is secured within supports which form bundles for installation in the distillation tower. As olefins and aromatics proceed into the catalyst section and react, the heavier alkylated aromatics drop out into the lower fractionation section and out the bottom of the tower with the remainder of the reformate. Light components, including light gases, proceed through the reactor and are stripped in the upper distillation section. Part of the unreacted benzene is recycled back to the tower to increase benzene conversion. Non-condensible gases go to fuel and light liquid is circulated back to the refinery gas plants or to gasoline blending.

BACKGROUND OF THE INVENTION

The present process finds applicability to a number of refining techniques, including fluid catalytic cracking (FCC), coking, and catalytic reforming, among others. Fluidized catalytic cracking (FCC) of heavy petroleum fractions is one of the major refining methods to convert crude or partially-refined petroleum oil to useful products, such as fuels for internal combustion engines and heating oils. A principal product of the FCC process is FCC gasoline, i.e., a liquid fraction boiling in the gasoline-range. FCC gasoline can contain a minor amount of benzene and other aromatics. The products may also include a mixture of hydrocarbon gases ranging from hydrogen, methane, ethylene, ethane, propylene, propane, to butylene, isobutane, butane, and heavier hydrocarbon gases. Various fractions of the gases are recovered in a vapor recovery unit.

While the details of a vapor recovery unit may vary, a typical arrangement involves first feeding the reactor effluent into a main fractionator. The fractionator overhead is compressed and fed into a de-ethanizer where the $C_2$ and lighter gas entrained with some $C_3$'s and $C_4$'s is separated as an overhead product and fed into a sponge absorber A lean sponge oil, typically a slip stream of heavy gasoline or light cycle oil, is used in the absorber to recover as much as possible the $C_3+$ components in the de-ethanizer overhead. The rich sponge oil is usually returned to the main fractionator. Although it may still contain some $C_3+$ components, the absorber overhead is usually called off-gas and is used as refinery fuel after some treating for sulfur removal. The de-ethanizer bottoms are fed into a de-propanizer where most of the propane/propylene gas is recovered as overhead.

Coking is a method to minimize refinery yields of residual fuel oil by severe thermal cracking of stocks such as vacuum residuals and thermal tars. It has been used to prepare coker gas oil streams suitable for feed to a catalytic cracker, to prepare hydrocracker feedstocks, to produce a high quality "needle coke" from stocks such as catalytic cracker heavy cycle oil, and to generate low BTU refinery fuel gas. Similar to catalytic cracking, coking produces a range of gas and liquid products which are separated in a distillation section. The lightest fraction which goes through a sponge oil absorber is usually called tail gas or off-gas and is used as refinery fuel gas.

Catalytic reforming is a method to covert low octane gasoline and naphtha streams into higher octane gasoline blending stock. The process typically increases the aromatic contents from 5-10% in feed to 45-60% in the liquid product, which is called "reformate". The benzene content makes up only from 2% to 10% of the reformate and is therefore a minor component of the reformate. The liquid products from a catalytic reformer are typically debutanized in a debutanizer which is sometimes called a stabilizer. The reformate is either sent directly to storage, or further separated to light reformate and heavy reformate. In some refineries, light aromatics such as benzene, toluene, and xylene are recovered as chemicals.

It would be advantageous if the minor amount of benzene in FCC gasoline and reformate could be alkylated to the maximum extent by the appropriate selection of reaction process and catalyst, using available olefin-containing refinery feedstocks.

SUMMARY OF THE INVENTION

The present invention relates to a new method of conducting catalytic chemical reactions in a refinery distillation column for the reduction of light aromatics in a complex refinery stream, wherein product, by-product, and unreacted feed are continuously separated.

Among other factors, the present invention is based on our finding that a particularly advantageous method for the catalytic alkylation of undesirable aromatics, especially benzene, present in minor amounts in complex refinery streams, comprises alkylating those aromatics with light olefins found in other complex refinery streams. The alkylation is performed under distillation conditions. Since the purity of the products is not a consideration of this invention, some side reactions such as polymerization of olefins and multiple alkylation of aromatic rings may also occur and the products included in the product streams without effecting the integrity of the process or the product. The primary aromatic being converted is benzene and the preferred catalysts are beta and Y-82 zeolites.

The method of this invention reduces the benzene content of a complex refinery stream containing a minor amount of benzene, such as reformate, light reformate or FCC gasoline by feeding the complex refinery stream to a distillation column reactor. The reactor contains one or more fixed beds of a zeolite-containing alkylation catalyst separated by distillation packing. No special supports are necessary to secure the catalyst. One or more olefin-containing streams, such as an FCC off-gas, itself a chemically complex refinery stream, is also fed to the distillation reactor. The benzene from the benzene-containing complex refinery stream is contacted with the olefin, such as propylene, from the olefin-containing refinery stream in the presence of the alkylation catalyst to produce alkylation product, such as cumene and ethyl benzene. The distillation reactor permits recovery of the complex refinery stream comprising the alkylation products, but having a reduced benzene content. Of course, other light aromatics present in the complex refinery stream may also be alkylated and their alkylation products are also found in the product stream. Other complex reactions depending upon the composition of the complex refinery stream are also taking place. The benzene and olefin are contacted in the presence of the alkylation under distillation conditions such as from about 90° to 500° F. and from about 30 to 500 psi.

DETAILED DESCRIPTION OF THE INVENTION AND SPECIFIC EMBODIMENTS

The present invention comprises a process for the alkylation of light aromatics, particularly benzene, in a complex refinery process stream containing a minor amount of benzene, using an olefin-containing stream, also ordinarily produced in the refinery. The alkylation is performed in a distillation-type column, such as an FCC absorber. "Light aromatics" includes aromatics of low molecular weight, in particular, benzene and toluene, more particularly benzene.

Complex Refinery Streams

Any complex refinery streams containing light and aromatics and a minor amount of benzene which need to be and can be reduced in benzene content by alkylation is appropriate for use in the present process. By "complex refinery streams", it is intended to mean the normally liquid product streams found in a refinery from cokers, FCC units, reformers, hydrocrackers, hydrotreaters, delayed cokers, distillation columns, etc. which streams comprise a range of chemical constituents, mainly hydrocarbonaceous, and having a broad boiling point range. The preferred complex refinery stream is selected from the group consisting of reformate, light reformate, heart-cut reformate, FCC gasoline, FCC light gasoline, coker gasoline, and coker light gasoline. Light reformate is most preferred and comprises a complex aromatics-containing stream containing a minor amount of benzene, produced in a refinery reforming unit, and generally having a boiling point range of 60° to 220° F. It is preferred that the benzene concentration of the light aromatics-containing streams is between about 1 and 40% by volume, more preferably between about 2 and 30%, and most preferable between about 5 and 25%.

Any olefin-containing stream, preferably refinery-produced, is appropriate for use in this process. The preferred olefin-containing stream or streams are themselves complex refinery streams although normally gaseous. They are selected from the group consisting of FCC de-ethanizer overhead, FCC absorber overhead, sweetened FCC off-gas and sweetened coker off-gas. The major portion of the olefins in these streams ordinarily comprises ethylene and propylene. The concentration of olefins in these olefin-containing streams may vary, but is preferably between about 5 to 40% olefin by volume, and more preferably between about 10 and 30% by volume. Because this group of refinery streams is typically used as refinery fuel, it provides a cheap source of olefins. In another embodiment, the preferred streams are FCC de-propanizer overhead and coker de-propanizer overhead. The major portion of the olefins in these streams may comprise propylene. In that case, the concentration of the olefins in the olefin-containing stream may be between about 30 to 90% by volume, more preferably between about 50 to 80% by volume.

Since propylene is typically more active than ethylene in alkylating light aromatics, this group of refinery streams can usually achieve higher percentages of benzene conversion. Furthermore, since more than one stream of olefin-containing streams can be used simultaneously, a combination of the olefin-containing streams can often provide the most economical combination of olefins in fuel gas and high benzene conversion.

In the practice of this invention it is preferred that the ratio of olefin, in the olefin-containing stream, to benzene, in the complex refinery stream containing a minor amount of benzene, be stoichiometric, or more preferably, with excess olefin, most preferably, greatly in excess olefin, in the realization that other reactants for olefin exist in the complex refinery stream. Specifically, the goal of the invention is to maximize the alkylation of benzene, as well as other light aromatics, and to minimize the amount of benzene in the complex refinery stream recovered from the process. Consequently, unlike the catalytic processes heretofore disclosed, and unlike even the distillation catalytic processes heretofore disclosed, the process of this invention will use an olefin-containing stream containing a reactive excess of olefin, preferably much in excess of the stoichiometric amount, generally in a mol ratio of benzene to olefin (preferably propylene) of about one or less.

Distillation Column

One of the unique features of the present invention is its use of a distillation column, integral with the refinery process, for the alkylation reaction. This contrasts with prior art teaching suggesting the use of fixed bed reactors. This has a number of process advantages. First and most importantly, it permits the concurrent or countercurrent flow of the reaction streams while facilitating the generally simultaneous catalytic alkylation reaction and the distillation of some reaction products. Secondly, it allows for the use of an existing column which may be in place in the refinery inventory. The distillation column may, however, also be a separate dedicated vessel.

One particular preferred embodiment involves using an existing FCC absorber column as the distillation column of choice. The advantage to using the absorber is that, as described in greater detail below, the aromatics-containing stream serves as the sponge oil, as well as the source of alkylation reactants.

In a preferred embodiment, a complex refinery stream containing light aromatics and a minor amount of benzene are fed into the lower part of a distillation column reactor which is packed with one or several beds of catalysts separated by distillation packings. Concurrently, one or more olefin-containing streams are fed into the lower end of the fixed beds of catalysts. Alkylation of the aromatics takes place inside the column in the presence of catalyst. A portion of the unreacted components and the resulting products flows downwardly and is removed at or near the bottom of the column. This is either returned to the main fractionator for further distillation or sent directly to storage for gasoline blending. The unreacted olefin-containing streams and some entrained liquid components flow upwardly and are partially condensed in an overhead condenser. Part of the liquid is returned to the column as distillation reflux. The uncondensed gas is sent to refinery fuel gas system and part of the condensed liquid is sent to storage for gasoline blending.

It is contemplated that the reaction may be carried out in either concurrent or counter-current flow. In a concurrent arrangement, all reaction streams are introduced into the lower part of the distillation column. Olefin-containing gas is distributed into several streams in order to minimize multialkylation of aromatic rings. In a countercurrent arrangement, the liquid stream is introduced into the upper part of the distillation column while the vapor stream is introduced into the lower part of the column.

In a more preferred embodiment of the present invention the alkylation reaction is conducted using light reformate as the aromatics-containing stream, FCC off-gas and/or de-propanizer overhead as the olefin-containing stream, and an refinery-integral FCC absorber as the distillation column reactor.

Figure 3:
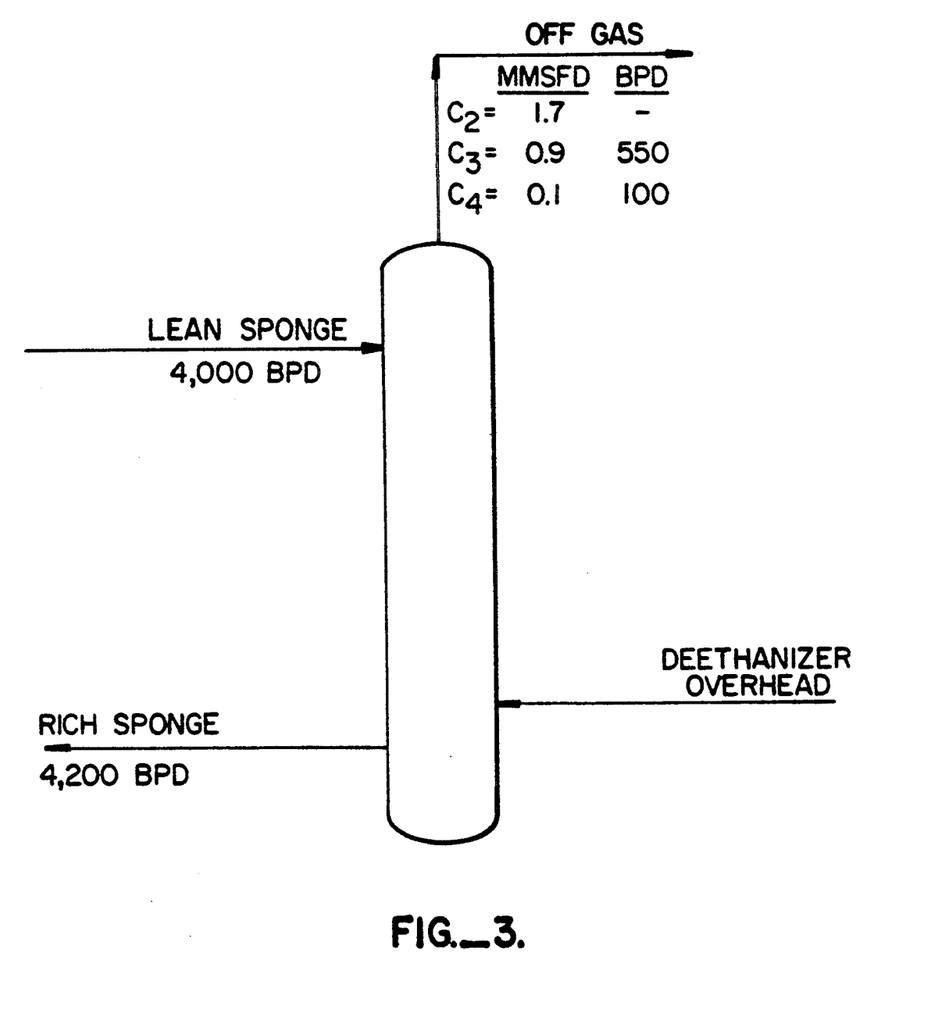
FIG. 3 is a schematic representation of a typical FCC absorber found in a refinery.

As illustrated in FIG. 3, the absorber ordinarily uses a sponge oil, such as FCC light cycle oil or heavy gasoline, to absorb and thereby remove heavier olefins from the refinery stream. This results generally in an overhead ethylene-rich stream containing ethylene, propylene, and some butene. In the preferred embodiment of the present invention, the aromatics-containing stream is essentially functioning as the sponge oil, and simultaneously catalytically reacting with olefins in the olefin-containing stream.

In another embodiment, either de-ethanizer overhead gas which contains principally hydrogen, methane, ethylene and ethane gas, and may also have entrained some propylene, propane, butylene, isobutane, n-butane and heavier hydrocarbons, and/or a de-propanizer overhead gas, which is similar but contains a preponderance of propylene and propane, is fed into the lower part of a distillation column and flows upwards. A stream of reformate, preferably light reformate, is introduced to the top part of the column and flows downwards. Alkylation of benzene and light aromatics takes place inside the column in the presence of a catalyst and the resulting products flow downwardly. The reformate also acts as sponge oil and picks up heavy hydrocarbons such as $C_3$'s, $C_4$'s and heavier hydrocarbons. The enriched liquid stream containing alkylation product is recovered near the bottom of the column and is either returned to the main fractionator for further distillation or sent directly to storage for gasoline blending. The de-olefinized gas and the vaporized components of the reformate are partially condensed in an overhead condenser and part of the condensed liquid is returned to the column as distillation reflux. The uncondensed gas is sent to refinery fuel gas system and part of the condensed liquid is sent to storage for gasoline blending.

The preferred process conditions for operating the distillation column reactor include a temperature of between about 90°–500° F., preferably between about 200°–500° F., and a pressure of between about 30–500 psi, preferably between about 50–200 psi.

Alkylation Catalyst

The desirable chemical reactions are facilitated with the presence of a suitable catalyst. Examples of catalysts suitable for aromatics alkylation include shape-selective zeolite such as ZSM-5, high silica/alumina ZSM-5, silicalite, Beta zeolite, hydrogen or rare earth-exchanged Y-zeolite. The preferred catalysts include Beta, Y-82, LZ-20, and LZ-210 zeolites. It is especially preferred to use Beta and Y-82 zeolites. The catalysts may be formed either in any conventional manner or in the shapes of distillation packing but two favored methods are by either extruding or spray-drying.

Beta zeolite is a synthetic crystalline aluminosilicate originally described in U.S. Pat. Nos. 3,308,069 and Re. 28,341, to which reference is made for further details of this zeolite, its preparation and properties, and which is incorporated herein by reference. Its use in an alkylation process similar to that of the present invention is disclosed in U.S. Ser. No. 134,410, Innes, et al., filed Dec. 17, 1987, also incorporated herein by reference.

U.S. Pat. Nos. 3,308,069 and Re. 28,341 describe the composition of beta zeolite in its synthesized form as follows:

$$[XNa(1.0\pm0.1-X)TEA]AlO_2 \cdot Y\ SiO_2 \cdot W\ H_2O$$

wherein X is less than 1, preferably less than 0.75, TEA represents tetraethylammonium ion, Y is greater than 5 and less than 100, and W is up to about 4, depending on the condition of dehydration and on the metal cation present. These patents also teach that the sodium may be replaced by another metal ion using ion exchange techniques.

Subsequent publications such as European Patent Applications Nos. 95,304, 159,846, 159,847, and 164,939 have broadened the definition of beta zeolite to include materials prepared using templating agents other than tetraethylammonium hydroxide and materials having Si/Al atomic ratios greater than 100. Also, the zeolites described in European Patent Applications Nos. 55,046 and 64,328 and British Patent Application No. 2,024,790 have structures and X-ray diffraction patterns very similar to that of beta zeolite and are included within the scope of the term "beta zeolite", as used herein.

The forms of beta zeolite which are most useful in the present invention are crystalline aluminosilicates having the empirical formula:

$$(X/n)M \cdot (1.0 \pm 0.1 - X)Q \cdot AlO_2 \cdot Y\ SiO_2 \cdot W\ H_2O$$

wherein X is less than 1, preferably less than 0.75, Y is greater than 5 and less than 100, W is up to about 4, M is a metal ion, n is the valence of M, and Q is a hydrogen ion, an ammonium ion or an organic cation, or a mixture thereof. For purposes of the present invention, Y is preferably greater than 5 and less than about 50. Consequently, the silicon to aluminum atomic ratio in the above formula is greater than 5:1 and less than 100:1, and preferably greater than 5:1 and less than about 50:1. It is also contemplated that other elements, such as gallium, boron and iron, can be variably substituted for aluminum in the above formula. Similarly, elements such as germanium and phosphorus can be variably substituted for silicon.

Suitable organic cations are those cations which are derived in aqueous solution from tetraethylammonium bromide or hydroxide, dibenzyl-1,4-diazabicyclo[2.2.- 2]octane chloride, dimethyldibenzyl ammonium chloride, 1,4-di(lazonium bicyclo[2.2.2]octane)butane dibromide or dihydroxide, and the like. These organic cations are known in the art and are described, for example, in European Patent Applications Nos. 159,846 and 159,847, and U.S. Patent No. 4,508,837. The preferred organic cation is the tetraethylammonium ion.

M is typically a sodium ion from the original synthesis but may also be a metal ion added by ion exchange techniques. Suitable metal ions include those from Groups IA, IIA or IIIA of the Periodic Table or a transition metal. Examples of such ions include ions of lithium, potassium, calcium, magnesium, barium, lanthanum, cerium, nickel, platinum, palladium, and the like.

For high catalytic activity, the beta zeolite should be predominantly in its hydrogen ion form. Generally, the zeolite is converted to its hydrogen form by ammonium exchange followed by calcination. If the zeolite is synthesized with a high enough ratio of organonitrogen cation to sodium ion, calcination alone may be sufficient. It is preferred that, after calcination, a major portion of the cation sites are occupied by hydrogen ions and/or rare earth ions. It is especially preferred that at least 80% of the cation sites are occupied by hydrogen ions and/or rare earth ions.

The pure zeolite may be used as a catalyst, but generally it is preferred to mix the zeolite powder with an inorganic oxide binder such as alumina, silica, silica/alumina, or naturally occurring clays and form the mixture into tablets or extrudates. The final catalyst may contain from 1 to 99 weight percent beta zeolite. Usually the beta zeolite content will range from 10 to 90 weight percent, and more typically from 60 to 80 weight percent. The preferred inorganic binder is alumina. The mixture may be formed into tablets or extrudates having the desired shape by methods well known in the art. The extrudates or tablets will usually be cylindrical in shape. Other shapes with enhanced surface-to-volume ratios, such as fluted or poly-lobed cylinders, can be employed to enhance mass transfer rates and, thus, catalytic activity.

Part of the distillation column is preferably packed with catalytic material which incorporates the suitable catalyst discussed above. For example, zeolite catalysts may be spray-dried or extrudated with proper bindings. Sulfonic acid may be ion-exchanged into resins which are then prepared in granular or bead form. The catalysts may also be combined with other suitable materials and made into a shape of conventional distillation packing such as Penn State packings, Pall rings, saddles or the like. Other packing shapes include Gempak high efficiency structured packing and Cascade MiniRings. The catalytic material may be located either in a series of zones or one particular part of the distillation column where the liquid and the vapor streams are in contact. Because the alkylation reactions are exothermic, dividing up the catalytic material into several zones will help minimize local high temperatures. The material is arranged such that it provides a sufficient surface area for catalytic contact of the reaction streams.

The following examples are provided to illustrate the invention in accordance with the principles of the invention, but are not to be construed as limiting the invention in any way except as indicated by the claims.

EXAMPLES

Example 1

Preparation of Beta Zeolite

A 524.06-gram portion of Ludox AS-30 silica sol was added dropwise to 20.85 gms of sodium aluminate Na2Al2O4·3H2O and 652.22 gms of 20% tetraethylammonium hydroxide solution.

The mixture was stirred for two days without heat, then charged to a one-gallon autoclave. After six days in the autoclave at 150° C. and without stirring, a large amount of crystalline material had formed. This material was filtered, washed, and oven-dried overnight at 100° C. to yield 141 gms of crystalline powder. The oven-dried material was calcined for 10 hours at 1,000° F. Both the air-dried and calcined materials were identified by X-ray diffraction as beta zeolite.

Two more batches of beta zeolite were prepared identically to the first batch except that the amounts of the starting materials used were multiplied by 0.61 and 1.22 to yield 89.7 and 195.5 gms of oven-dried zeolite, respectively. In both cases, X-ray diffraction patterns confirmed that the oven-dried and calcined products were beta zeolite.

The combined calcined material was analyzed by ICP spectroscopy. The Si/Al atomic ratio was 13/1 and the sodium content was 0.3 weight percent. The surface area of the calcined zeolite measured by the nitrogen adsorption was 640 m²/g.

Example 2

Ammonium Exchange of Beta Zeolite

A 355 gram portion of the calcined beta zeolite from Example 1 was divided into three equal portions which were each ammonium exchanged four times. The exchanges were carried out by soaking the zeolite in approximately two liters of 0.7N ammonium nitrate solution overnight at 212° F. After each of the first three exchanges, the supernatant liquid was decanted off and fresh ammonium nitrate solution added. After the final exchange, the product was filtered, washed with distilled water, and oven-dried.

Example 3

Formation of Extrudates

The ammonium-exchanged beta zeolite from Example 2 was calcined for five hours at 1,000° F. to convert the zeolite to its hydrogen form. A 320-gram portion of the calcined zeolite was dry-mixed with 112.7 gms of Catapal alumina (71% $Al_2O_3$). Distilled water and dilute nitric acid were added to peptize the alumina and bring the mixture to a consistency suitable for extrusion. A hydraulic press was used to extrude the mixture through a 1/16-inch die. The extrudates were collected in a large evaporating dish, oven-dried, then calcined at 400°–1,000° F.

Example 4

Preparation of a Simulated FCC Off-gas

A simulated FCC off-gas was prepared by mixing various gases to arrive at the following composition:

| Component | Volume % |
| --- | --- |
| Hydrogen | 30 |
| Methane | 30 |
| Ethane | 15 |
| Ethylene | 15 |
| Propane | 5 |
| Propylene | 5 |

Example 5

Preparation of a Reformate Feed

A complex reformate feed containing a minor amount of benzene was prepared by withdrawing whole reformate products from two commercial reformers over a period of several hours and blending the products. The composite has the following properties:

| Component | Weight % |
| --- | --- |
| Benzene | 6.0 |
| Toluene | 21.2 |
| Xylenes | 25.0 |
| Other Constituents | 47.8 |
| Gravity, API | 41.4 |

| TBP Distillation Volume % | F |
| --- | --- |
| 5 | 97 |
| 10 | 140 |
| 30 | 209 |
| 50 | 231 |
| 70 | 282 |
| 90 | 337 |
| 95 | 362 |

Example 6

Preparation of a Light Reformate Feed

A light reformate feed containing a minor amount of benzene was prepared by distilling the reformate feed in Example 5 to remove the heavier portion. It has the following properties:

| Component | Weight % |
| --- | --- |

| -continued | |
| --- | --- |
| Benzene | 22.8 |
| Toluene | 2.7 |
| Xylenes | 0.0 |
| Other Constituents | 74.5 |
| Gravity, API | 67.7 |

| TBP Distillation Volume % | F |
| --- | --- |
| 5 | 82 |
| 10 | 97 |
| 30 | 140 |
| 50 | 156 |
| 70 | 176 |
| 90 | 197 |
| 95 | 209 |

Example 7

Preparation of a Pilot Plant

Figure 1:
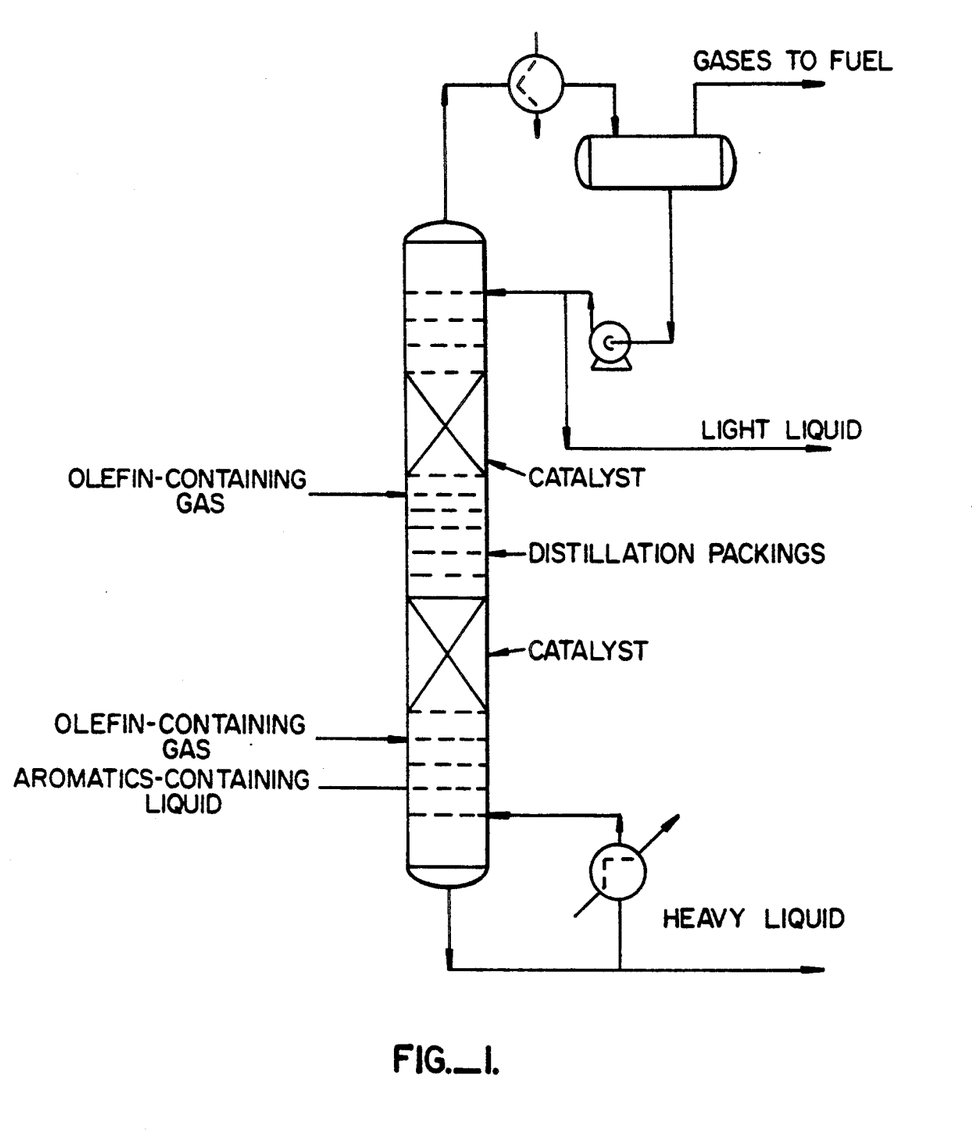
FIG. 1 is a schematic representation of a concurrent catalytic distillation unit representative of the present invention. Several catalytic zones are separated with distillation packings. More than one stream of olefin-containing gas may be used.
Figure 2:
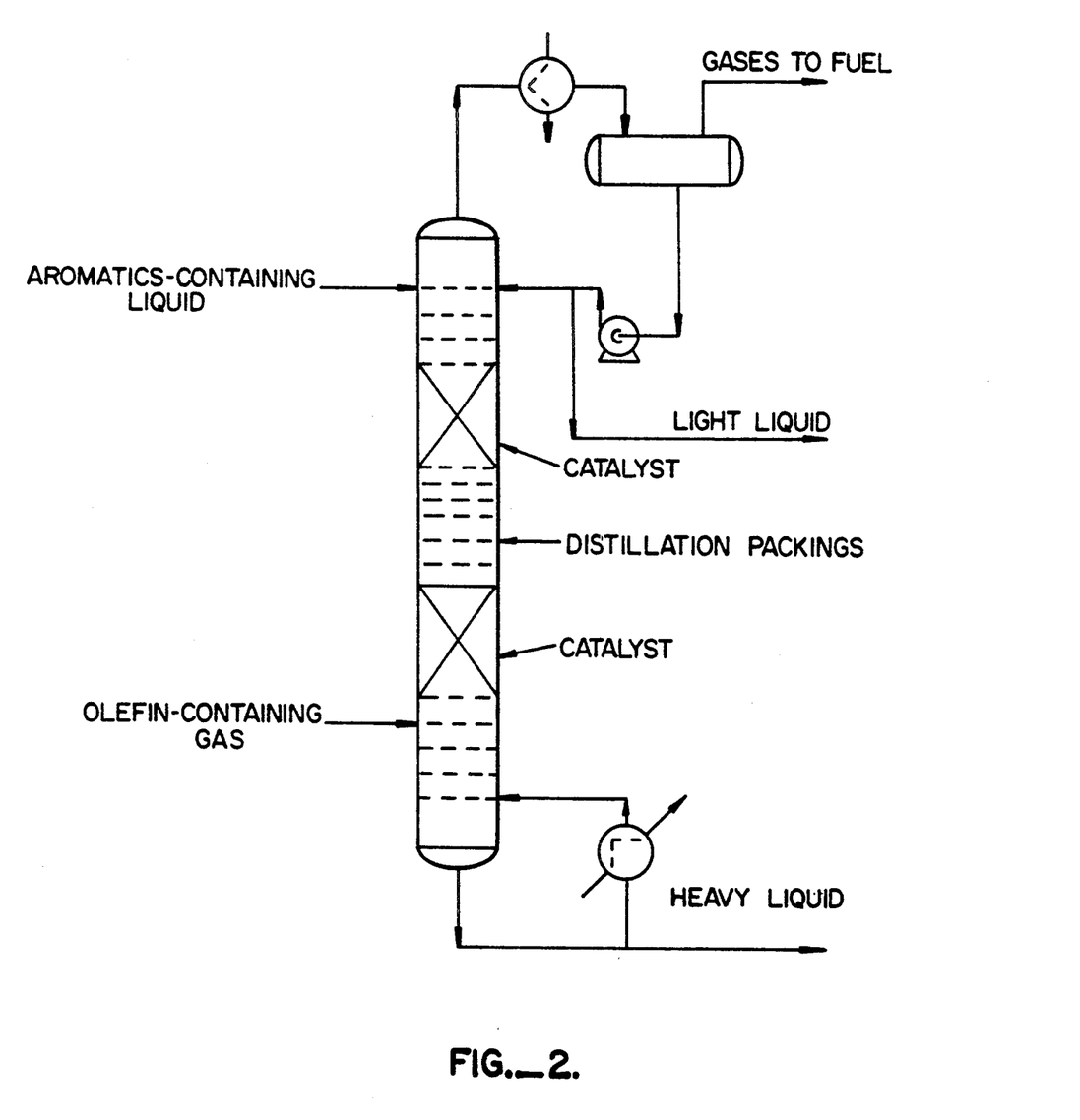
FIG. 2 is a schematic representation of a countercurrent catalytic distillation unit representative of the present invention.

A distillation reactor was prepared by packing two zones of catalyst and three zones of distillation packings into a 1¼ in. by 4 ft. steel tube. Each zone of catalyst contains about 100 ml. of catalyst and the two zones are separated with a 4 in. zone of Penn State packings. Overhead reflux and bottoms reboiling loops are installed in a manner similar to the schematic representation of FIG. 1. The pressure of the pilot plant is maintained with back pressure regulation and the temperatures of different areas are controlled with individual heaters.

Example 8

Concurrent Catalytic Distillation at 150 Psig

A concurrent flow experiment was conducted using the beta zeolite of Example 3, the simulated FCC off-gas of Example 4, the light reformate feed of Example 6, and the pilot plant of Example 7. The pressure was maintained at 150 psig and a reactor temperature profile was maintained such that it has a mid temperature of 400° F. The gas and liquid rates were maintained at 1.8 mols/hr. and 142 grams/hr., respectively. The overhead reflux ratio was maintained at 3.

Gas analyses showed the disappearance of olefins as follows:

| | Mols/Hour | | |
| --- | --- | --- | --- |
| Component | In | Out | Δ |
| Ethylene | 0.273 | 0.099 | −0.174 |
| Propylene | 0.091 | 0 | −0.091 |

Liquid analyses showed the disappearance of benzene and toluene and the appearance of heavier aromatics as follows:

| | Mols/Hour | | |
| --- | --- | --- | --- |
| Component | In | Out | Δ |
| Benzene | 0.415 | 0.282 | −0.133 |
| Toluene | 0.042 | 0.028 | −0.014 |
| Xylenes | 0 | 0.044 | 0.044 |
| $C_9$ Aromatics | 0 | 0.009 | 0.009 |
| $C_{10}$ Aromatics | 0 | 0.010 | 0.010 |
| $C_{11}$ Aromatics | 0 | 0.016 | 0.016 |
| $C_{12}+$ Aromatics | 0 | 0.001 | 0.001 |

These data clearly indicate that chemical reactions took place between the olefins in gas and the aromatics in liquid. Calculations showed that the conversion of the components are as follows:

| Component | Conversion, % |
|---|---|
| Propylene | 100 |
| Ethylene | 64 |
| Aromatics | 32 |

The conversion for aromatic was lower than that for olefins because the olefin/aromatics ratio used in this experiment was 0.8, while the stoichiometric requirement for this product distribution is 1.6. The conversion for aromatics is expected to increase with more olefin in feed.

Example 9

Concurrent Catalytic Distillation at 200 Psig

A concurrent flow experiment was conducted using the beta zeolite of Example 3, the simulated FCC off-gas of Example 4, the light reformate feed of Example 6, and the pilot plant of Example 7. The pressure was maintained at 200 psig and a reactor temperature profile was maintained such that it had a mid temperature of 430° F. The gas and liquid rates were maintained at 1.8 mols/hr. and 140 grams/hr., respectively. The overhead reflux ratio was maintained at 3.

Gas analyses showed the disappearance of olefins as follows:

| Component | Mols/Hour In | Out | Δ |
|---|---|---|---|
| Ethylene | 0.273 | 0.120 | −0.153 |
| Propylene | 0.091 | 0 | −0.091 |

Liquid analyses showed the disappearance of benzene and toluene and the appearance of heavier aromatics as follows:

| Component | Mols/Hour In | Out | Δ |
|---|---|---|---|
| Benzene | 0.408 | 0.293 | −0.115 |
| Toluene | 0.041 | 0.014 | −0.027 |
| Xylenes | 0 | 0.014 | 0.014 |
| $C_9$ Aromatics | 0 | 0.020 | 0.020 |
| $C_{10}$ Aromatics | 0 | 0.051 | 0.051 |
| $C_{11}$ Aromatics | 0 | 0.018 | 0.018 |
| $C_{12}+$ Aromatics | 0 | 0.001 | 0.001 |

These data also clearly indicate that chemical reactions took place between the olefins in gas and the aromatics in liquid. Calculations showed that the conversion of the components are as follows:

| Component | Conversion, % |
|---|---|
| Propylene | 100 |
| Ethylene | 56 |
| Aromatics | 32 |

The conversion for aromatic was lower than that for olefins because the olefin/aromatics ratio used in this experiment was 0.8, while the stoichiometric requirement for this product distribution is 1.6. The conversion for aromatics is expected to increase with more olefin in feed.

Example 10

Countercurrent Catalytic Distillation in a Typical FCC Absorber

Figure 4:
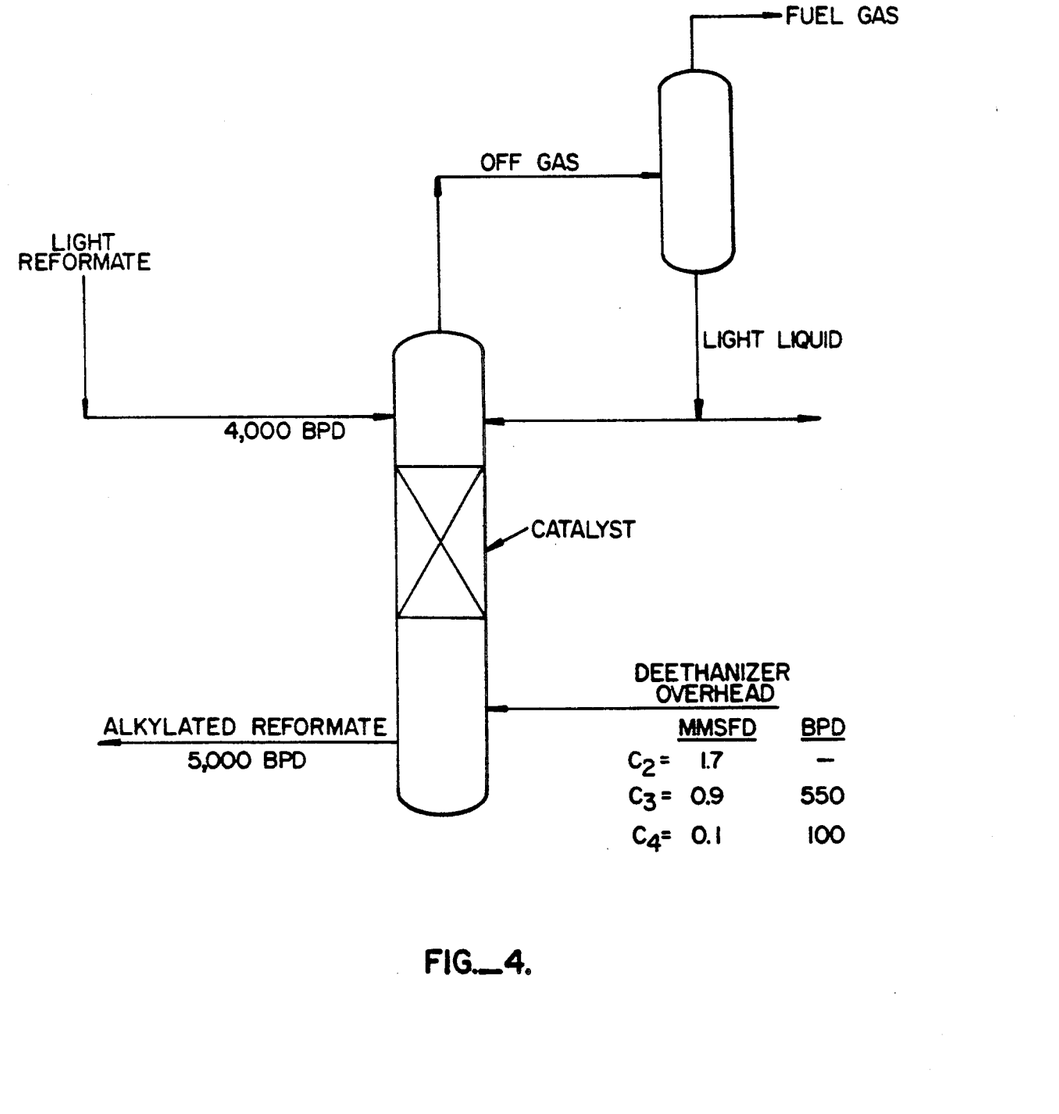
FIG. 4 is a schematic representation of an FCC absorber modified to carry out a specific embodiment of the present invention.

A typical FCC absorber, schematically represented in FIG. 3 is modified by means known to those of ordinary skill in the art to use light reformate as the sponge oil as schematically represented in FIG. 4. The total FCC off-gas, or preferably the de-ethanizer overhead, is also fed to the absorber as shown in FIG. 4.

Four thousand (4,000) barrels/day of light reformate is introduced in the top of the FCC absorber and 1.7 million standard cubic feet (scf) of de-ethanizer overhead gas is introduced into the bottoms of the absorber. Reflux is provided with an overhead condenser and a separator. A bed of beta zeolite catalyst is sandwiched between the distillation packings. Countercurrent flows of gas and liquid result in an alkylation reaction between the aromatics in the reformate and the olefins in the FCC off-gas, as well as increased volume and octane of the reformate. For example, the reaction between benzene and ethylene to form ethylbenzene results in 38% volume expansion. The research octane number increases from 98 to 107 when converting benzene to ethylbenzene. Similarly, the motor octane number increases from 90 to 98. Overall, this process arrangement increases the gasoline yield by about 1,000 barrels per day.

Example 11

Comparative Examples: Benzene Alkylation in a Fixed Bed versus Benzene Alkylation in a Catalytic Distillation Reaction The chemistry of benzene alkylation is sensitive to the type of reactor used as well as to the type of alkylation catalyst. The following comparitive examples illustrate the unpredictable nature of the catalysis.

| Catalyst | Non-Zeolite* | Y-82 | Beta |
|---|---|---|---|
| Fixed Bed Alkylation of Benzene | | | |
| Initial Benzene Conversion, % | 67 | 60 | 70 |
| Initial Propeylene Conversion, % | 80 | 75 | 95 |
| Catalyst Stability | good | poor | fair |
| Reaction Conditions: | | | |
| 26 wt % benzene in reformate feed | | | |
| 350° F. | | | |
| 400 psig | | | |
| 2 LHSV | | | |
| propylene/benzene mol ratio = 3 | | | |
| Catalytic Distillation Alkylation of Benzene | | | |
| Benzene Conversion | 5 | 38 | 28 |
| Reaction Conditions: | | | |
| 22 wt % benzene in reformate feed | | | |
| 430° F. | | | |
| 200 psig | | | |
| 1 LHSV | | | |
| propylene/benzene mol ratio = 1 | | | |

*Solid Phosphoric Acid (SPA)

The comparative examples illustrate the superiority of zeolitic over non-zeolitic catalysts in catalytic distillation under these conditions. The conversion of benzene can be increased for all the catalysts by increasing the mol ratio of olefin to benzene. In general, catalytic distillation alkylation is preferred to fixed bed catalytic alkylation because distillation alkylation can be performed under milder (lower pressure) conditions.

Although the foregoing invention has been described in some detail by way of illustration and example for purposes of clarity of understanding, it will be obvious that certain changes and modifications may be practiced within the scope of the following claims.

What is claimed is:

1. A method for reducing the benzene content of a complex refinery stream containing a minor amount of benzene comprises:
   (a) Feeding said complex refinery stream containing a minor amount of benzene to a distillation column reactor, said reactor containing one or more fixed beds of zeolite-containing alkylation catalysts separated by distillation packing;
   (b) Feeding one or more olefin-containing streams into said reactor;
   (c) Contacting said benzene with said olefin under distillation conditions in the presence of said zeolite-containing alkylation catalyst to produce an alkylation product; and
   (d) Recovering a complex refinery stream of reduced benzene content comprising said alkylation product.

2. The method as claimed in claim 1 wherein said complex refinery stream containing a minor amount of benzene is selected from the group consisting of reformate, light reformate, and FCC gasoline.

3. The method as claimed in claims 1 or 2 wherein benzene is present in said complex refinery stream in a concentration of between about 1 and 40% by volume.

4. The method as claimed in claim 3 wherein said concentration is between about 2 and 30% by volume.

5. The method as claimed in claim 4 wherein said concentration is between about 5 and 25% by volume.

6. The method as claimed claim 1 olefin-containing stream is selected from the group consisting of FCC off-gas, coker off-gas, FCC de-ethanizer overhead, FCC absorber overhead, sweetened FCC off-gas, sweetened coker off-gas, FCC de-propanizer overhead and coker de-propanizer overhead.

7. The method as claimed in claim 1 wherein said olefin comprises ethylene and propylene.

8. The method as claimed in claims 1, or 6 or 7 wherein the concentration of olefins in said olefin-containing stream is between about 5 and 40% by volume.

9. The method as claimed in claim 8 wherein the concentration of said olefins is between about 10 and 30% by volume.

10. The method as claimed in claim 1 wherein said olefin is present in said olefin-containing stream in reactive excess to the amount of benzene contained in said complex refinery stream.

11. The method as claimed in claim 1 wherein said catalyst is selected from the group consisting of beta zeolite, Y-zeolites, ultra stable Y-zeolites, ZSM-5, high silica/alumina ratio ZSM-5, LZ-20, LZ-210, Y-82, and morderite.

12. The method as claimed in claim 1 wherein said catalyst is selected from the beta- and Y-zeolites.

13. The method as claimed in claim 12 wherein said catalyst is Y-82.

14. The method as claimed in claim 1 wherein said distillation column is selected from the group as consisting of FCC absorbers, FCC de-propanizer, reformate splitters, FCC olefin splitters, and a dedicated column.

15. The method as claimed in claim 14 wherein said distillation column is an FCC absorber.

16. The method as claimed in claim 1 wherein said distillation column reactor is operated at a temperature of between about 90° and 500° F.

17. The method as claimed in claim 16 wherein said operating temperatures are between about 200° and 500° F.

18. The method as claimed in claim 1 wherein said distillation column reactor is operated at a pressure between about 30 and 500 psi.

19. The method as claimed in claim 18 wherein said operating pressure is between about 50 and 200 psi.

* * * * *